United States Patent [19]

Aldinger et al.

[11] 4,454,977

[45] Jun. 19, 1984

[54] PROCESS OF PRODUCING CORROSION-RESISTANT TUBULAR CONNECTION PIECES

[75] Inventors: Fritz Aldinger, Rodenbach; Harry Heinke, Erlensee; Franz Schreiber; Waltraud Werdecker, both of Hanau, all of Fed. Rep. of Germany

[73] Assignee: W. C. Heraeus GmbH, Hanau, Fed. Rep. of Germany

[21] Appl. No.: 367,912

[22] Filed: Apr. 13, 1982

[30] Foreign Application Priority Data

Apr. 16, 1981 [DE] Fed. Rep. of Germany ....... 3115393

[51] Int. Cl.³ .............................................. B23K 31/02
[52] U.S. Cl. .................................... 228/131; 228/175; 228/243
[58] Field of Search ............... 228/131, 170, 175, 243, 228/186, 160, 263.16, 217, 143, 189

[56] References Cited

U.S. PATENT DOCUMENTS

| | | | |
|---|---|---|---|
| 2,216,033 | 9/1940 | Hopkins | 228/189 |
| 2,769,231 | 11/1956 | Grenell | 228/175 |
| 3,140,108 | 7/1964 | Klein et al. | 228/263.16 |
| 3,479,730 | 11/1969 | Poth | 228/189 |
| 3,602,978 | 9/1971 | Oaks | 228/263.16 |
| 3,604,102 | 9/1971 | Boccalari | 228/170 |
| 3,664,816 | 5/1972 | Finnegan | 228/263.16 |
| 3,862,489 | 1/1975 | Weisinger | 228/143 |
| 4,099,661 | 6/1978 | Dick et al. | 228/160 |
| 4,118,542 | 10/1978 | Walter | 228/217 |

FOREIGN PATENT DOCUMENTS

| | | | |
|---|---|---|---|
| 637228 | 12/1978 | Japan | 228/243 |
| 6793 | 1/1981 | Japan | 228/217 |
| 23392 | 3/1981 | Japan | 228/243 |

Primary Examiner—Kenneth J. Ramsey
Assistant Examiner—Kurt Rowan
Attorney, Agent, or Firm—Frishauf, Holtz, Goodman & Woodward

[57] ABSTRACT

In order to connect a tube of a more common material, such as stainless steel, to a tube of a highly corrosion-resistant metal such as tantalum, where the two tubes cannot be welded together by fussion technology, a connection piece is made of two closely fitting layers of the two materials telescoped into each other, which are exposed to hot compressed noble gas, such as argon, in a pressure vessel, with precautions against oxidation from residual oxygen in the noble gas. Then the ends are machined to remove any hard soldered portion used to make a gas-tight seal of the blank before pressure treatment, after which a longer ring-shaped section of the stainless part of the connection piece is removed at one end and likewise a section of the tantalum part of the connection piece at the other end, so that the projecting ends can be welded to the pipes to be joined. One method of protection against oxidation is to use a blank in which a tantalum tube is fitted between two stainless steel tubes, one of which is completely removed by machining after the pressure treatment.

4 Claims, 4 Drawing Figures

PROCESS OF PRODUCING CORROSION-RESISTANT TUBULAR CONNECTION PIECES

This invention concerns a process for manufacturing tubular connection pieces of a corrosion-resistant metal of the group consisting of titanium, zirconium, niobium and tantalum, or of an alloy of one of these metals, and a second metal which is steel, nickel, nickel alloy or a cobalt alloy.

From published German patent application OS No. 24 15 198, it is known to make welded pipe connections by producing a rod-shaped connection piece out of metal combinations that cannot be welded by fusion technology by resorting to explosive plating, and then providing it with an axial bore.

It is also known to produce, by explosive plating, a steel tube coated with a corrosion-resistant metal, for example titanium or tantalum (see, for example, German Pat. No. 27 14 052).

With plating, disturbances or faults in the form of inner grooves or scores can occur in the connection zone, which lead to the formation of microcracks and thus impair the gas tightness and pressure tightness of a pipe connection made, for example, of steel explosively plated with tantalum.

THE INVENTION

It is an object of this invention to provide a process for the manufacture of a tubular connection piece out of a corrosion-resistant metal of the group above mentioned, and a second material such as steel, nickel, a nickel alloy or a cobalt alloy, which can produce a connection piece free of faults. It is a further object of the invention that such a connection piece should be gas-tight, liquid-tight and pressure-tight and usable for connecting two pipes or tubes of different materials that cannot be welded together.

Briefly, the connection piece is made by first isostatically hot-pressing a connection tube comprising a tubular layer of the corrosion-resistant metal and an adjacent layer of the second material, and then removing a ring-shaped section of the corrosion-resistant metal at one end and of the second material at the other end of the tube so pressed.

The process of the invention is preferably applied for the manufacture of connection pieces out of tantalum and steel.

The connection pieces prepared according to the invention have a boundary surface free of defects where the corrosion-resistant metal and the second material are bonded to each other, so that no danger of forming microcracks is present.

Isostatic hot-pressing is a known process step for the compacting of metallic and ceramic powders, for bonding metallic and ceramic materials, and for compacting porous materials.

Pressure containers suitable for use in isostatic hot-pressing in accordance with the invention are disclosed, for example, in German published patent applications OS Nos. 27 22 065 and OS 30 28 773.

For isostatic hot-pressing, a gaseous pressure medium is used, commonly the noble gases, particularly helium and argon. It is desirable for the isostatic hot-pressing step in the process of the invention to be carried out under conditions which do not lead to the formation of oxide layers on the corrosion-resistant metal. In order to prevent formation of oxides, the isostatic hot-pressing step can be performed in the presence of a medium that chemically binds oxygen, for example zirconium in the form of shavings, chips or other cuttings.

Another possibility for preventing access of oxygen to the surface of the titanium, zirconium, niobium or tantalum is a modification of the process to produce first a three-layer connection tube by the use of a third tubular layer, for example consisting of steel, as more particularly described below in Example 2, protecting the otherwise exposed layer of the corrosion-resistant metal, and then removing the third layer. It is advantageous to practice the invention in a manner in which the isostatic hot-pressing step produces connection tubing of such a length that a number of connection pieces may be manufactured out of one length of connection tubing. In this case the connection tubing length is subdivided into individual tube sections and then, according to the invention, ring-shaped sections are removed from each end of every pipe piece in the manner described below.

EXAMPLES AND DRAWINGS

The invention is further described below with reference to two specific examples, which are described with reference to the annexed drawings, in which.

EXAMPLES AND ILLUSTRATED EMBODIMENTS

EXAMPLE 1

Figure 1:
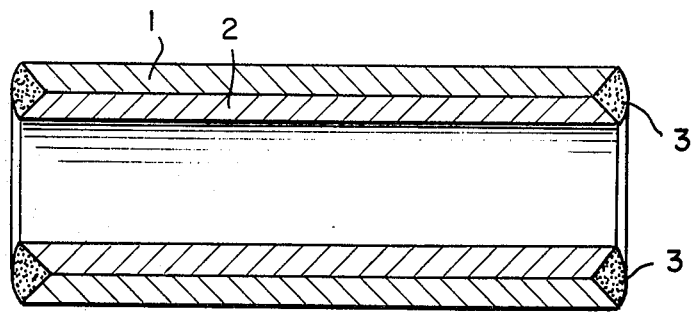
FIG. 1 is a longitudinal cross-section of a prepared composite tubular blank on which the process of the invention may be performed to produce a connection piece.

A stainless steel tube (length 100 mm, inner diameter 50 mm, thickness 6 mm) and a tantalum tube cleaned by pickling and degreasing (length 100 mm, outer diameter 50 mm, thickness 1 mm) were telescoped together and then bonded gas-tight together at 960° C. in vacuum ($10^{-5}$ mbar) with a solder of a gold-nickel alloy. FIG. 1 shows the stainless steel tube 1, the tantalum tube 2 within the stainless steel tube and the solder 3 bonding the two tubes gas-tight together. This figure illustrates the preparation of the initial closely fitting layers of two different metallic materials for the performance of the hot-pressing step of the process of the invention.

The blank illustrated in FIG. 1 is then embedded in zirconium filings or shavings contained in a pressure vessel and is then subjected for 180 minutes to pressure of 1200 bar and temperature of 900° C. produced by compressed hot argon in the pressure vessel. The zirconium particles protect the tantalum from oxidation by residual oxygen present in the argon of the purity of the commercially available technical grade. As the result of the simultaneous pressure and temperature treatment, a connection tube consisting of firmly bonded stainless steel and tantalum is obtained.

Thereafter the end faces of the connection tube are machined off and ring-shaped sections, each of 30 mm length, are removed by turning down in a lathe, of the stainless steel layer at one end and of the tantalum layer at the other end to produce a lapped connection piece.

Figure 2:
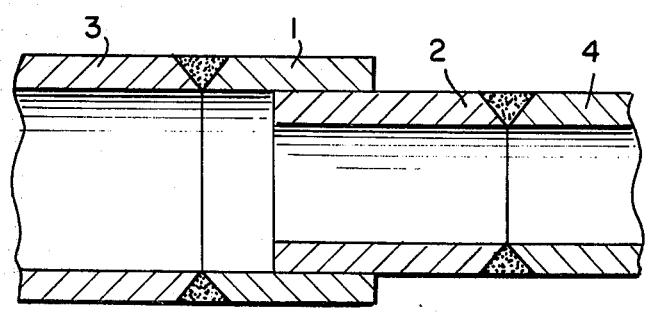
FIG. 2 is a longitudinal cross-section of a connection piece made from the blank shown in FIG. 1 welded at its opposite ends to pipes respectively of different materials.

FIG. 2 shows a connection piece made of a stainless steel tube 1 and a tantalum tube 2 in a manner similar to that just described in Example 1, having a lapped configuration resulting from the final machining step, so that the stainless steel portion alone extends to the left and the tantalum portion alone to the right, the former being welded to the end part of the stainless steel pipe 3, and the other end of the connection piece being welded to the end part of a tantalum pipe 4.

EXAMPLE 2

A tantalum tube of 270 mm length, 1 mm thickness and 62 mm inner diameter is inserted between two stainless steel tubes of 290 mm length and 6 mm thickness, having respective inner diameters of 64 mm and 50 mm, the shorter tantalum tube being inserted symmetrically, so that the stainless steel tubes extend beyond it in both directions. The stainless steel tubes are then welded together at their ends in a helium atmosphere, so that the two stainless steel tubes 1 and 3 surround the tantalum tube in a gas-tight fashion, as illustrated in FIG. 3.

The tubes thus fitted together are then subjected to isostatic hot-pressing in a suitable pressure vessel with the use of argon as the pressure gas for 90 minutes at a pressure of 2000 bar and a temperature of 950° C.

Then the welded ends and the outer stainless steel layer are removed from the connection tube formed in the hot-pressing stage. The remaining connection tube, now consisting of two layers, is then subdivided into three tubular pieces, each of 90 length. Ring-shaped sections, in each case of 30 mm length, are then removed, at one end of each 90 mm piece by turning down the tantalum tube portion of the compacted piece and, at the other end by turning down the stainless steel tube portion of the compacted piece.

Figure 3:
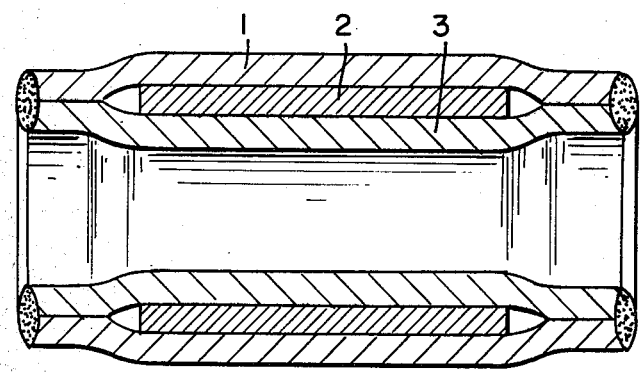
FIG. 3 is a longitudinal cross-section of a tubular blank made by a three-layer process according to the invention.
Figure 4:
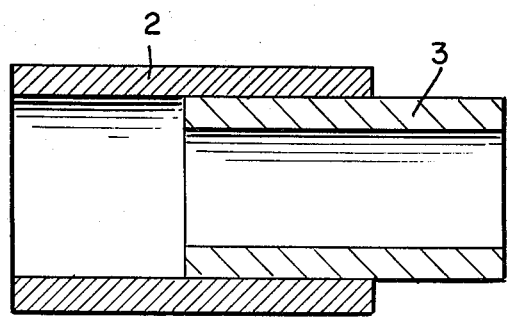
FIG. 4 is a longitudinal cross-section of a connection piece made from the blank of FIG. 3 after isostatic hot-pressing.

FIG. 4 shows a connection piece composed of the tantalum tube 2 and the stainless steel tube 3 which is provided from the blank of FIG. 3.

Although the invention has been described with reference to particular illustrated examples, it will be understood that modifications and variations are possible within the inventive concept.

We claim:

1. Process of producing a tubular connection piece for connecting a pipe of a first material to a pipe of a second material not readily weldable to said first material, said first material being a substance selected from the group consisting of titanium, zirconium, niobium and tantalum, with or without minor alloy additions, and said second metallic material being a substance selected from the group consisting of steels, nickel, nickel alloys and cobalt alloys, said method comprising the steps of:
    preparing a connection tube blank by fitting a tubular piece of said first material between two longer tubular pieces of said second material closely fitting respectively the outside and the inside surfaces of said tube of said first material of said tubular piece of said first material, so that the ends of said pieces of said second material extend beyond corresponding ends of said tubular piece of said first material, and welding together the adjacent ends of said pieces of said second material to produce a gas-tight seal;
    isostatically hot-pressing said connection tube blank in a pressure vessel;
    removing at least part of the welded end portions of said hot-pressed composite tube extending beyond the portion which encloses a tubular layer of said first material and also removing the outer tubular layer of said second material substantially entirely from the hot-pressed connection tube, and
    thereafter removing an annular section of the remainder of the hot-pressed tube which consists of said first material at one end and removing an annular section of the end portion of the remainder of the hot-pressed tube which consists of said second material at the other end of the hot-pressed tube.

2. Process as defined in claim 1, in which said first component material is tantalum and said second component material is steel.

3. Process as defined in claim 2, in which said second component material is stainless steel.

4. Process as defined in claim 1, 2 or 3, in which said connection tube blank is long enough for manufacture therefrom of a plurality of connection pieces, and in which, after the hot-pressing step and before the removal of said annular sections respectively of said first and second materials, the hot-pressed composite tube is subdivided into a plurality of pieces, each of which is thereafter subjected to removal of said annular sections.

* * * * *